MICROSCOPIC ALIGNMENT MECHANISM
Filed May 13, 1968
FIG. 1.
FIG. 2.
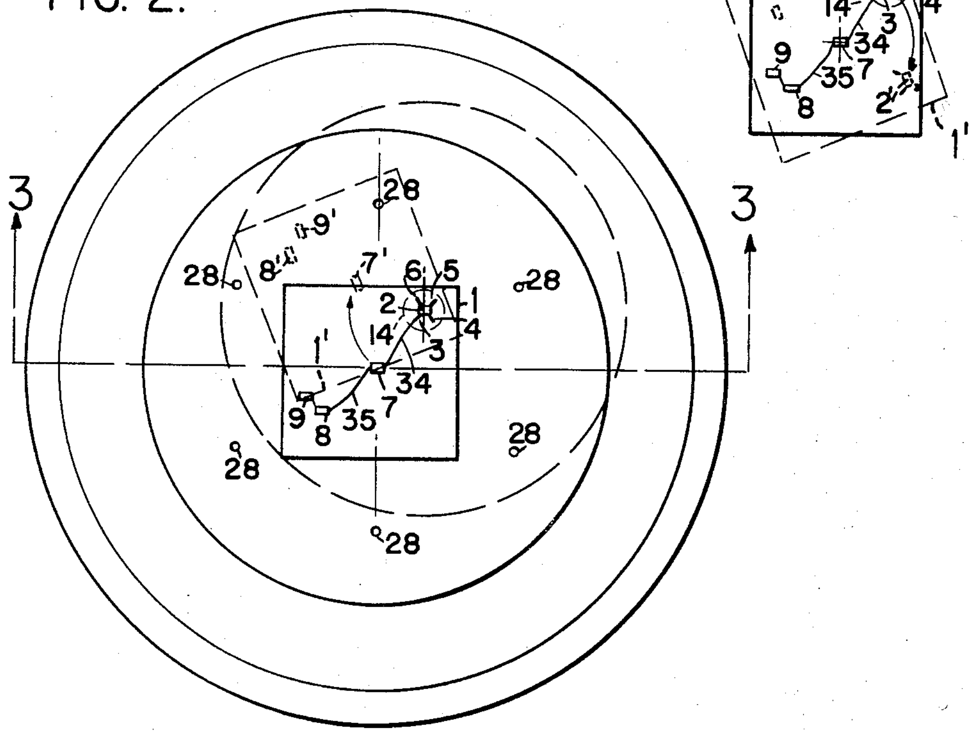
FIG. 3.
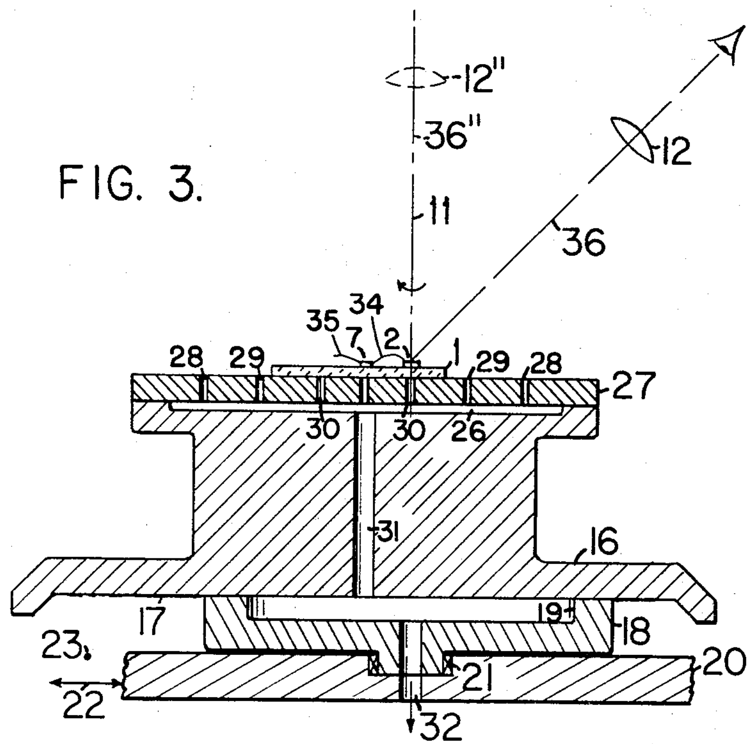

United States Patent Office 3,549,232

Patented Dec. 22, 1970

3,549,232

MICROSCOPIC ALIGNMENT MECHANISM

Frances Hugle, Santa Clara, Calif.; William B. Hugle, executor of said Frances Hugle, deceased, assignor to Hugle Industries, Inc., Sunnyvale, Calif., a corporation of California Filed May 13, 1968, Ser. No. 728,492
Int. Cl. G02b *21/24, 21/32*
U.S. Cl. 350—90 4 Claims

ABSTRACT OF THE DISCLOSURE

A mechanical mechanism for adjustably micro-positioning a small workpiece of the nature of an integrated circuit. The workpiece is held to the upper surface of a grease plate, as by vacuum means. A moveable platform supports the grease plate and may be rotated manually or by means of a motor drive. By bringing the point of interest (where work is to be performed) within the field of view of a microscope by manually sliding the grease plate, subsequent rotation of the platform retains the point of interest as the center of rotation. In this way the usual plural items of work can be accomplished around a point of interest by merely energizing the motor rotational means.

BACKGROUND OF THE INVENTION

This invention pertains to manipulative apparatus for orienting a workpiece.

Prior art alignment mechanisms have provided only translational and rotational means that are fixed with respect to a moveable platform. The center of rotation has been fixed with respect to the structure of the mechanism, not with respect to a selected point of interest upon the workpiece. Thus, rotative manipulation alone of the workpiece resulted in the point of interest being "lost" from the field of view of typical viewing means, such as a microscope. Typically, the work to be performed consists in welding a plurality of connections around a point of interest, such as those of a transistor upon the workpiece. With mechanisms of the prior art an agonizing combination of translation and rotation was required of the operator to again find the point of interest in repositioning the workpiece for successive weldings around it. Additionally, prior mechanisms have invariably accommodated only a small work area, of the order of ⅜" in diameter.

SUMMARY OF THE INVENTION

A grease plate is employed atop a moveable platform. The compound horizontal positioning adjustment thus afforded provides means for positioning the center of rotation of the assembly at any point of interest. This allows plural circumferentially positioned locations to be brought to the working tool by merely actuating one means for rotating the assembly, and thereby the workpiece. Since the workpiece is typically viewed by means of a microscope, this invention allows rotational manipulation without loss of the work area from the field of view.

BRIEF DESCRIPTION OF THE DRAWINGS

FIG. 1 is a sketch in plan view of the arrangement of the prior art.

FIG. 2 is a plan view of the alignment mechanism according to this invention.

FIG. 3 is a sectional elevation of the same taken along line 3—3 of FIG. 2.

DESCRIPTION OF THE PREFERRED EMBODIMENT

In FIG. 1 numeral 1 identifies a workpiece, such as the substrate of an integrated circuit of the hybrid type.

A transistor is located at the upper right corner, having external connections 3, 4, 5 and 6. Similarly, other transistor or circuit elements are disposed elsewhere upon the substrate; such as resistor 7 having two terminals, capacitor 8, and a second resistor 9.

The purpose of the alignment mechanism of this invention is to position selected points of interest upon the substrate workpiece at a given position, such as that occupied by the tip of an ultrasonic welder. This position is represented by center-line 11 in FIG. 3. The nature of the workpiece, the disposition of elements thereon, and the operation accomplished upon it are subject to wide variation, of which the above examples are illustrative.

In the prior art showing of FIG. 1 the field of view of a microscope, indicated by lens 12 in FIG. 3, is represented by dashed cricle 14. It is well known that the field of a microscope of sufficient magnifying power to be useful must include only a small area of workpiece 1. On the other hand, the workpiece is typically placed upon the support member of the alignment mechanism at the center of rotation thereof, so that all parts of the workpiece can be reached by known X–Y translational of the mechanism.

With this configuration it is clear that rotation of the workpiece to work upon successive connections of the transistor which lie upon differential radials as shown, causes transistor 2 and its connections 3, 4, 5, and 6 to pass far beyond the field of view 14 of the microscope.

The situation is shown by the dotted alternate position 1′ of original workpiece 1. Both are shown in FIG. 1. Identifying numeral 1′ is shown in the same position with respect to the substrate as numeral 1 was shown in the full lines of the figure. It is seen that workpiece in this illustrative example has been rotated approximately 90° clockwise. Transistor 2, now identified as 2′, is now in the lower right-hand corner of FIG. 1 and it can only be brought back into the field of view 14 of the microscope by bothersome and time-consuming X–Y adjustments of the alignment mechanism.

Very much the opposite condition prevails in the alignment mechanism according to this invention, as shown in FIGS. 2 and 3.

The various items of FIG. 1 have the same identifying numerals in FIG. 2. However, instead of the center of rotation being at the center of workpiece 1, at 7, it is now at the center of transistor 2.

How this is accomplished is seen more easily in FIG. 3. Grease plate 16 has grease 17 on its lower surface. Platform 18 has an annular surface in contact with the grease. Since the surfaces in contact are suitably machined and ground to planar surfaces, one may slide with respect to the other to give various relative horizontal positions.

A vacuum-tight seal is obtained between the outside of platform and the inside cylindrical cavity thereof having wall 19 in view of the planar surfaces and the grease. Base 20 provides a support for the previously identified elements 16 and 18, including a recess to receive gear 21, which gear is structurally part of platform 18. By means of a further gear meshing with gear 21 and means to drive the further gear, both of which have not been shown, platform 18 may be rotated. This may be accomplished manually or by means of a reversible electric motor, as known.

Base 20, in turn, is preferably translatable in the X direction as shown by arrow 22 and in the Y direction at right angles thereto as shown by the end-on arrow 23. This is typically accomplished by connecting base 20 to the reduced motion point of a known pantograph linkage, with a six to one reduction ratio from the external manual control to base 20.

Of prime importance is the fact that in the general case of the use of the alignment mechanism of this invention the vertical axis of grease plate 16 is not colinear with axis 11 of moveable platform 18. In use, the operator grasps grease plate 16 and moves it manually to bring the point at which work is to be performed to essentially the center of the filed of view 14. This, of course, causes grease plate 16 to move with respect to platform 18. Known, commercially available grease causes a strong mechanical bond between elements 16 and 18, although transverse relative (sliding) motion between the two can be accomplished by exerting a force of convenient magnitude.

In FIGS. 2 and 3 the center of rotation has been made the center of transistor 2 by this manipulation. Accordingly, when the means to rotate, gear 21, is rotated, any radial position around the transistor is obtainable, as by energizing a reversible electric motor, as has been mentioned.

Workpiece 1 is typically attached to the mechanism of this invention by a vacuum chuck, which becomes a part of elements 16 and 18. Grease plate 16 is provided with diametrical grooves at symmertically different circumferential positions, of which groove 26 is one. A chuck plate 27 surmounts this upper surface of plate 16. The chuck plate has an outer ring of six holes 28, equally circumferentially spaced. Another ring of six holes 29 is located at a smaller radius than that of holes 28 and in a different circumferential relation than holes 28. A still further ring of six holes 30 is located at a still smaller radius than that of holes 29 and at a different circumferential relation than that of either holes 28 or 29. Three diametrical grooves, including groove 26 and equivalent thereto but a different circumferential position, allow only one ring of holes to mate with one groove at a particular selected orientation of plate 27 with respect to plate 16. In this way, vacuum is present at only one ring of holes at any one time.

In the situation illustarted in FIGS. 2 and 3, only holes 30 are arranged to have vacuum, thereby to hold workpiece 1 securely to plate 27. An axial bore 31 extends from groove 26, and the others which are not seen because of the sectional nature of the drawing, completely through grease plate 16. These plural channels allow pneumatic connection to the cavity in platform 18 regardless of the relative positions of plate 16 and platform 18. A similar axial bore 32 leads from the cavity in platform 18 through base 20 and to a vacuum pump, not shown.

The rings of holes 29 and 30 have not been shown in the plan view of FIG. 2 for sake of clarity of the other elements detailed there.

Illustrative fine connecting wires 34 and 35 connect from one connection 3, of transistor 2 to one terminal of resistor 7 and from the other terminal of resistor 7 to one terminal of capacitor 8, respectively. Such would be the work accomplished when the alignment mechanism is employed as part of an ultrasonic bonder, and all the four connections to transistor 2 would be completed while the center of rotation of the mechanism was set for the center of transistor 2.

Optical axis 36 of the microscope represented by lens 12 is shown in its normally inclined position in FIG. 3. However, this axis may be made colinear with axis of rotation 11, i.e., it may be vertically disposed, as indicated at 36'' and 12''. Such vertical disposition is employed with other mechanisms, such as a flip-chip bonder.

An important advantage of the grease plate type of assembly of this invention is that it may easily be proportioned to give a relatively very large area of possible working positions, such as the area within a square having two inch sides. Embodiments of the prior art have provided an area within a circle only ⅜'' in diameter.

Having thus fully described my invention and the manner in which it is to be practiced, I claim:

1. A mechanism for adjustably micro-positioning a workpiece (1) comprising:

(a) a horizontally moveable base (20), having a horizontally rotatable platform (18) above said base, (b) a grease plate (16) exclusively atop of and in adhesive relation to said platform, and horizontally adjustable with respect thereto to carry said workpiece, (c) vertically inclined means (12) to view said workpiece and stationary with respect to the center of said rotatable platform and having an optical axis (36) intersecting the axis of rotation (11) of said rotatable platform (18) at the surface of said workpiece, and (d) gear means (21) concentric with said platform to rotate said platform, whereby on area of said workpiece selected by adjustment of said grease plate, remains within the field of view of said inclined means to view said workpiece regardless of rotation of said platform and the position of said grease plate, a cavity (19) within said rotatable platform (18), a channel (32) through said rotatable platform and said base (20) connecting to said cavity, whereby a vacuum created in said channel holds said grease plate (16) and said rotatable platform together.

2. The mechanism of claim 1 in which:

(a) said axis of rotation (36'') and said optical axis (36) are colinear.

3. The mechanism of claim 1 in which:

(a) said base and said grease plate together have a range of motion many times greater than the extent of said field of view.

4. The mechanism of claim 1 which additionally includes:

(a) a chuck plate (27) surmounting said grease plate and removeably attached thereto, and (b) plural aperture means (28, 29 or 30) upon said chuck plate to hold said workpiece (1) to said chuck plate by said vacuum.

References Cited

UNITED STATES PATENTS

| | | | |
|---|---|---|---|
| 2,698,554 | 1/1955 | Baversfeld | 350—66 |
| 3,333,274 | 7/1967 | Forcier | 350—90 |
| 2,070,037 | 2/1937 | Baversfeld | 350—90X |
| 3,437,929 | 4/1969 | Glenn | 350—810X |

OTHER REFERENCES

Langdon et al.: "IBM Technical Disclosure Bulletin," "Work Holders and Alignment Devices," vol. 5, No. 9, February 1963, pp. 7–8.

PAUL R. GILLIAN, Primary Examiner